US008849267B2

(12) United States Patent
Garg (10) Patent No.: US 8,849,267 B2
(45) Date of Patent: Sep. 30, 2014

(54) LOCATION-BASED CALL CONTROL

(75) Inventor: Neeraj Kumar Garg, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1596 days.

(21) Appl. No.: 11/688,388

(22) Filed: Mar. 20, 2007

(65) Prior Publication Data

US 2008/0233935 A1    Sep. 25, 2008

(51) Int. Cl.
*H04M 3/42* (2006.01)
*H04W 4/16* (2009.01)
*H04L 29/08* (2006.01)
*H04W 4/00* (2009.01)
*H04W 4/02* (2009.01)
*H04W 8/10* (2009.01)

(52) U.S. Cl.
CPC . *H04W 4/16* (2013.01); *H04W 8/10* (2013.01); *H04L 67/24* (2013.01); *H04W 4/001* (2013.01); *H04W 4/02* (2013.01); *H04L 67/18* (2013.01)
USPC ... 455/417; 455/456.2; 370/335; 379/211.02; 379/220.01

(58) Field of Classification Search
USPC ................. 370/259–263, 335, 352; 455/414.1–414.4, 415–417, 455/456.1–457, 445, 461, 456.2, 428, 433, 455/439, 456.3, 456.4; 379/211.02–211.04, 379/212, 1, 201, 2, 224, 88.16, 211.8, 379/201.07–201.1, 211.01–212.01, 269, 379/142.07, 142.1–142.14, 220.01; 709/239; 340/988, 689, 994, 995.25; 342/457, 107, 357.62
See application file for complete search history.

(56) References Cited

U.S. PATENT DOCUMENTS

| 5,197,092 | A | 3/1993 | Bamburak |
| 5,978,673 | A | 11/1999 | Alperovich et al. |
| 6,131,028 | A | 10/2000 | Whitington |
| 6,233,448 | B1 | 5/2001 | Alperovich et al. |
| 6,807,423 | B1 | 10/2004 | Armstrong et al. |
| 6,853,634 | B1 * | 2/2005 | Davies et al. ................. 370/349 |
| 7,031,698 | B1 | 4/2006 | Appelman |
| 7,076,255 | B2 | 7/2006 | Parupudi et al. |
| 7,082,192 | B2 * | 7/2006 | Weaver ..................... 379/211.02 |
| 2002/0138580 | A1 | 9/2002 | Al-Kazily et al. |
| 2003/0224795 | A1 | 12/2003 | Wilhoite et al. |

(Continued)

OTHER PUBLICATIONS

Roy Want, et al. The Active Badge Location System. http://shamir.eas.asu.edu/~cse591uc/papers/want92active.pdf. Last accessed Feb. 2, 2007.

(Continued)

*Primary Examiner* — Mahendra Patel
(74) *Attorney, Agent, or Firm* — Andrew Smith; Doug Barker; Micky Minhas (57) ABSTRACT

An architecture is presented that automatically detects a location of a user and forwards messages to a pre-configured number associated with the detected location. A location system is provided that comprises a location component and a routing component. The location component publishes presence information of a mobile device. The presence information is associated with a physical location of the mobile device. Once the mobile device's presence information is published, the routing component automatically sets the call forwarding to the physical location for communication to a user of the mobile device. The message is routed to a pre-configured number associated with the physical location of the mobile device. A user of the mobile device pre-configures numbers associated with various frequently visited physical locations (e.g., home, club, etc.).

17 Claims, 10 Drawing Sheets

(56) References Cited

U.S. PATENT DOCUMENTS

| | | | |
|---|---|---|---|
| 2005/0064855 A1 | 3/2005 | Russell | |
| 2005/0105698 A1* | 5/2005 | Patfield | 379/88.17 |
| 2005/0201362 A1 | 9/2005 | Klein et al. | |
| 2005/0201533 A1* | 9/2005 | Emam et al. | 379/88.19 |
| 2005/0260994 A1 | 11/2005 | Losch | |
| 2006/0072715 A1* | 4/2006 | Michael et al. | 379/88.12 |
| 2006/0093121 A1 | 5/2006 | Sylvain | |
| 2006/0193460 A1* | 8/2006 | Cadiz et al. | 379/211.02 |
| 2007/0081640 A1* | 4/2007 | Jachner | 379/88.16 |

OTHER PUBLICATIONS

Stefan Berger, et al. Ubiquitous Computing Using SIP. http://www1.cs.columbia.edu/~xiaotaow/rer/Research/Paper/nossdav03.pdf. Last accessed Feb. 2, 2007.

Bernd Mrohs, et al. Context-aware Presence Management. http://www.mrohs.com/publications/Bernd%20Mrohs%20-%20Context-aware%20Presence%20Management.pdf. Last accessed Feb. 2, 2007.

International Search Report for PCT/US2008/056911, Mailed on Aug. 5, 2008, 2 pages.

* cited by examiner

LOCATION-BASED CALL CONTROL

BACKGROUND

It is often cost effective for a user who frequently travels from one office of an enterprise to another office of the enterprise, for the enterprise to route the user's calls to the office in the new location rather than forwarding the calls to the user's mobile device. Furthermore, a network may experience a service disruption, which would prohibit calls from being received.

To complicate matters, a user who frequently leaves the office may be at locations where mobile devices are not available and/or there is a poor connection. Business colleagues and other individuals who may need to contact the user are forced to forego communications with the user and/or wait until the user returns to the office. Moreover, the user may not wish to give out their mobile device number to all individuals.

Therefore, subscribers of a mobile device should register an alternative number, such as a cell phone number, a relative's phone number, or a work number at specified physical locations, that the network can use to forward calls to whenever the user leaves the office and travels to an alternate physical location.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a location system that comprises a location component and a routing component. The location component publishes presence information of a mobile device. The presence information is associated with a physical location of the mobile device. Once the mobile device's presence information is published, the routing component automatically sets the call forwarding to the physical location for communication to a user of the mobile device. The message is routed to a pre-configured number associated with the physical location of the mobile device. A user of the mobile device pre-configures numbers associated with various frequently visited physical locations (e.g., home, club, etc.).

Further, the location component and routing component of the location system communicate with a communications server. The communications server can be a Live Communication Server® which supports an architecture where a user could simultaneous be at multiple devices, such as a Desktop, a Web Client and a Mobile Client. The Mobile Client represents the physical location where the user is actually present. Further, a Communicator Mobile® running on a user's mobile device can publish the user's physical location. The Communicator Mobile® running at a user's mobile device is able to identify when the user reaches a pre-configured location and sets unconditional forwarding to that specified location.

In another aspect of the claimed subject matter, the location component and routing component of the location system communicate with a session initiation protocol (SIP). The SIP is a signaling protocol that provides a mechanism for a computing device to locate another computing device on the network that it wants to communicate with and establish a session with the device. The SIP running on the mobile device publishes a user's rich presence information to the Live Communication Server, which communicates the information further based on the subscription model. Access to information about the physical location is then selectively managed. For privacy reasons, user's location(s) may or may not be made available to watchers.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is often cost effective for a user who frequently travels from one office of an enterprise to another office of the enterprise, for the enterprise to route the user's calls to the office in the new location rather than forwarding the calls to the user's mobile device. Moreover, the user may not wish to give out their mobile device number to all individuals. Therefore, subscribers of a mobile device should register an alternative number, such as a cell phone number, a relative's phone number, or a work number at specified physical locations, that the network can use to forward calls to whenever the user leaves the office and travels to an alternate physical location.

A location system is part of telecom network which establishes the location of the mobile phone and publishes the same to the mobile equipment. Once the location of the phone gets establishes and if it matches to preconfigured location by the user, the routing component within the Communicator Mobile® sets automatic call forwarding (unconditional) to predefined number based on user's setting.

A user of the mobile device pre-configures numbers associated with various frequently visited physical locations (e.g., home, club, etc.). Accordingly, the system allows the user to publish only the user's office number as the number the user is available at, and the system allows the user to receive calls at any of his pre-configured numbers depending on the user's physical location.

Figure 1:
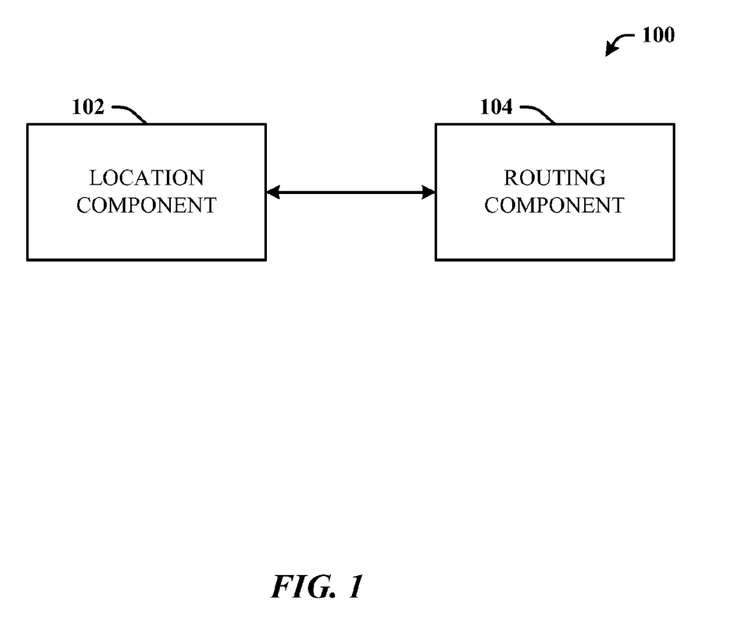
FIG. 1 illustrates a block diagram of a location system.

Referring initially to the drawings, FIG. 1 illustrates a location system 100 that comprises a location component 102 and a routing component 104. The location component 102 publishes presence information of a mobile device. The presence information is associated with a physical location of the mobile device. The presence information is also associated with the location of the mobile device on an IP network. The physical location of the mobile device is determined via global positioning system (GPS), triangulation, location services (LCS), cell of origin (COO), enhanced observed time difference (E-OTD), time of arrival (TOA), angle of arrival (AOA), or any other similar mobile positioning system. GPS is a satellite-based navigation system made up of a network of 24 satellites placed into orbit by the U.S. Department of Defense. GPS receivers take signal information from the satellites and use triangulation to calculate a user's exact location. COO, E-OTD, TOA and AOA, all require reference beacons or antennas stationed within the network. Accordingly, multiple approaches may be used to detect the mobile device's physical location.

Once the mobile device's physical location is detected, the location component 102 publishes the mobile device's presence information. In one example, short messaging service (SMS) Broadcast is used to allow the cellular network to broadcast the mobile device's location (presence information). The mobile user's presence has several components: Availability, Activity, Location, OOF Note, Calendar, etc. However, other broadcast messaging services can be used to publish the mobile device's presence information. It is thus to be understood that any suitable broadcast and messaging services are contemplated and intended to fall under the scope of the hereto-appended claims.

Once the mobile device's presence information is published, the routing component 104 automatically activates the call forwarding rule in the enterprise telephony network (Live Server® in case of Microsoft® solution). The message could be a telephone call, email, text mail, etc. The message is routed to a pre-configured number associated with the physical location of the mobile device. A user of the mobile device pre-configures numbers associated with various frequently visited physical locations (e.g., home, club, etc.). The user can enter these numbers directly into the mobile device to be associated with the subscriber information or the numbers can be configured directly to a communications server. Once the numbers are pre-configured for each specific physical location, messages are routed to the pre-determined numbers based on the detected physical location of the mobile device. Thus, the infrastructure allows a user to publish his desk phone number as the only number he could be available at, and the infrastructure allows the user to receive calls at the pre-configured numbers depending on the user's physical location.

Figure 2:
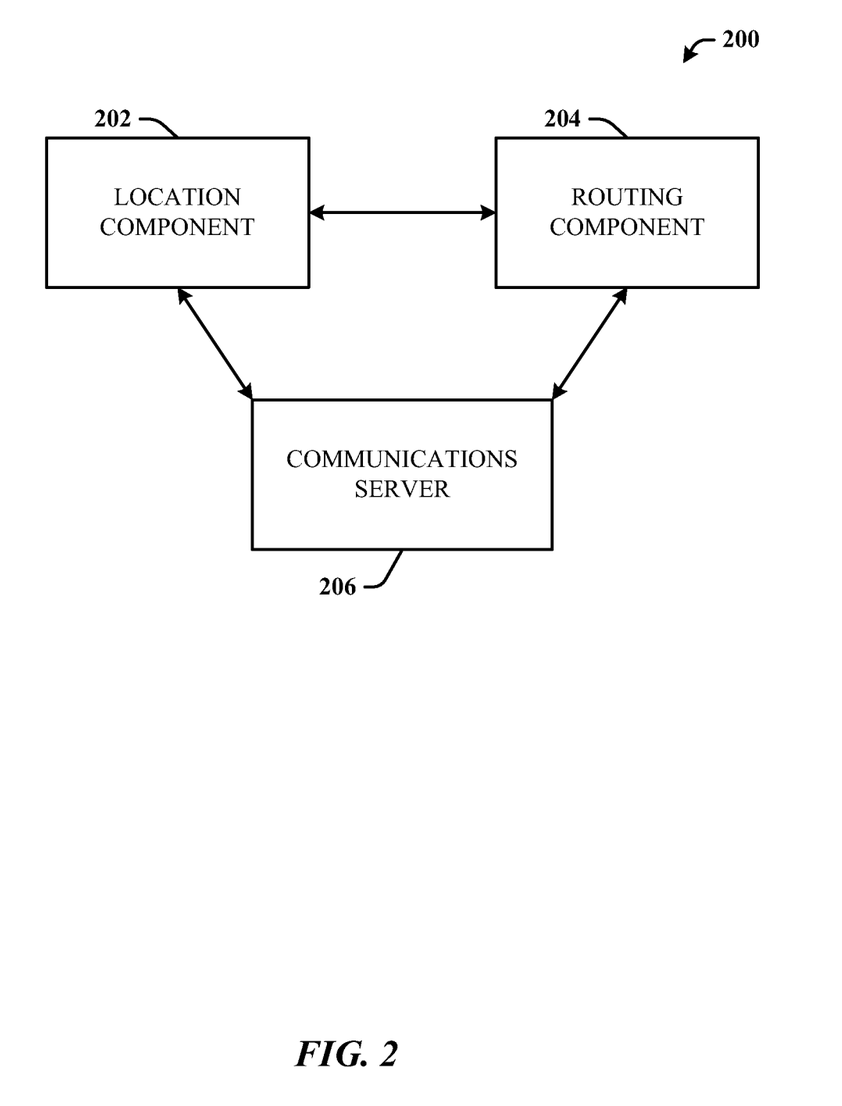
FIG. 2 illustrates a block diagram of the location system wherein a location component and routing component are in communication with a communications server.

In another implementation illustrated in FIG. 2, the location component 202 and routing component 204 of the location system 200 communicate with a communications server 206. The communications server can be a Live Communication Server® which supports an architecture where a user could simultaneous be at multiple devices, such as a Desktop, a Web Client and a Mobile Client. The Mobile Client represents the physical location where the user is actually present. Further, a Communicator Mobile® running on a user's mobile device can publish the user's physical location. The Communicator Mobile® running at a user's mobile device is able to identify when the user reaches a pre-configured location and sets unconditional forwarding to that specified location.

Figure 3:
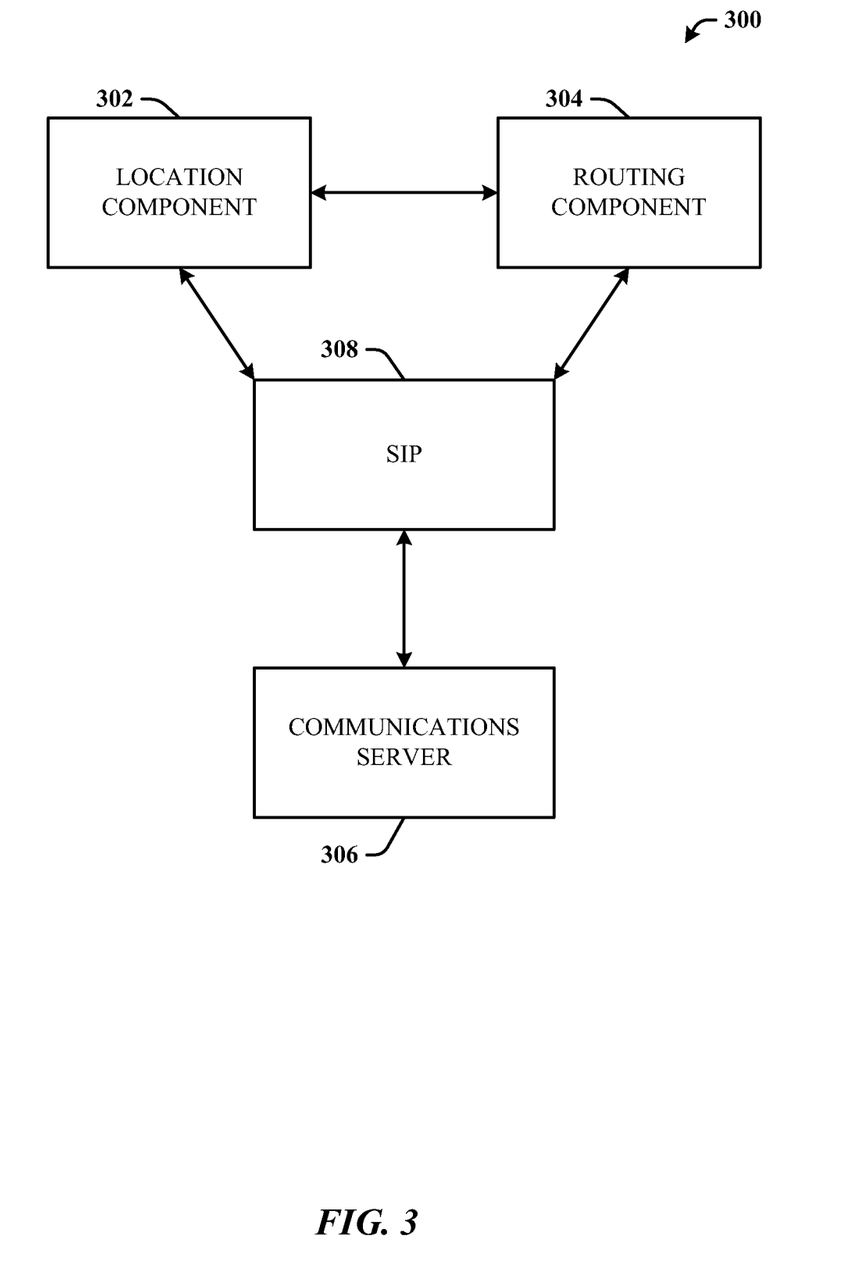
FIG. 3 illustrates a block diagram of the location system wherein a location component and routing component are in communication with SIP and the communications server.

In more detail, FIG. 3 illustrates the location component 302 and routing component 304 of the location system 300 communicating with a session initiation protocol (SIP) 308 and a communications server 306. SIP is a signaling protocol that provides a mechanism for a computing device to locate another computing device on the network that it wants to communicate with and establish a session with the device.

Each end-point actively contributes to a user's presence by publishing a user's and device activity from that end-point. SIP running on the mobile device publishes a user's rich presence information to the Live Communication Serve®, which communicates the information further based on the subscription model. In more detail, the mobile device is connected with the Live Communication Server® with data connectivity. SIP messages are sent from the Communicator Mobile® to the server which further forwards the request to the private branch exchange (PBX) on computer-supported telecommunications applications (CSTA). The PBX sets the unconditional forwarding to a user's specified location. A Private Branch Exchange (PBX) is a subscriber-owned telecommunications exchange that usually includes access to the public switched telephone network (PSTN). The PBX can typically provide various advanced telephone services, such as call hold, call transfer, call forwarding, and conferencing, to name but a few. Moreover, the Communicator Mobile® allows users to stay connected to real-time communication capabilities even when away from their desktops. Communicator Mobile® is integrated with underlying phone capabilities and corporate directories to allow communication with anyone in the organization. The scenario depicted above is only one example, the same solution can well be used along with any enterprise telephony solution (e.g., soft switch).

Figure 4:
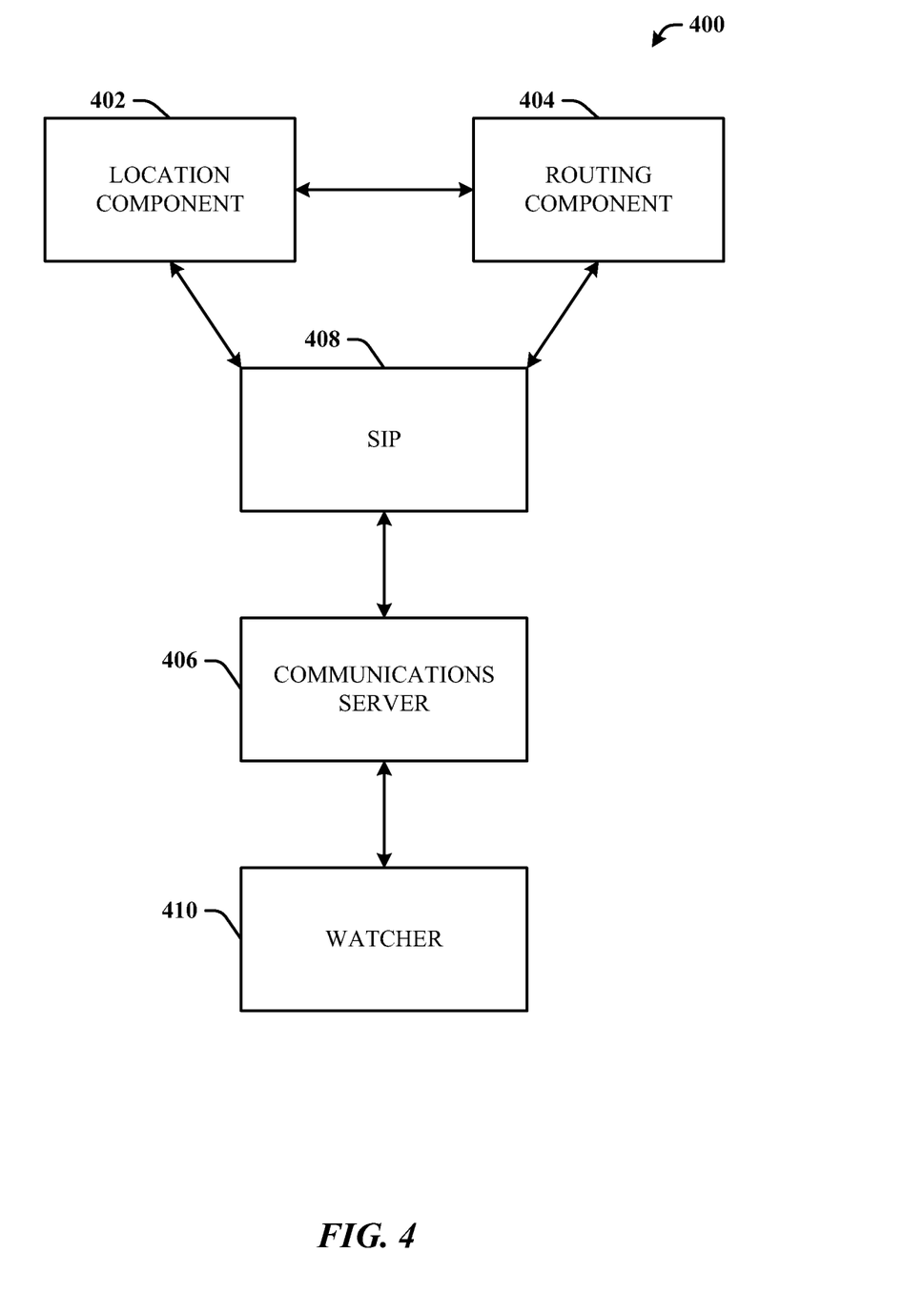
FIG. 4 illustrates a block diagram of the location system wherein a location component and routing component are in communication with a watcher, SIP and the communications server.

Furthermore, FIG. 4 illustrates the location component 402 and routing component 404 of the location system 400 communicating with SIP 408, a communications server 406 and a watcher 410. As stated supra, SIP 408 provides a mechanism for a computing device to locate another computing device on the network, i.e., establish a presence on the network. Specifically, presence conveys the ability and willingness of a user to communicate across a set of devices. A presence service is a system that accepts, stores, and distributes presence information to interested parties, called watchers 410. A presence protocol, such as the SIP protocol is used to establish connection between Live Communication Server® and its clients (Desktop, Web, Mobile) for providing a presence service over the Internet or any IP network.

SIP protocol is particularly well suited as a presence protocol. SIP location services already contain presence information, in the form of registrations. Furthermore, SIP networks are capable of routing requests from any user on the network to the server that holds the registration state for a user, this registration state is a key component of user presence.

Each end-point of the SIP protocol actively contributes to a user's presence by publishing user and device activity from that end-point. Communicator Mobile®, running on user's mobile device, publishes user's location based on the presence information. For privacy reasons, user's location(s) may or may not be made available to the watchers 410. Thus, user's physical location would be kept from the watchers 410, unless a watcher 410 has been specifically granted permission to view the location(s).

Figure 5:
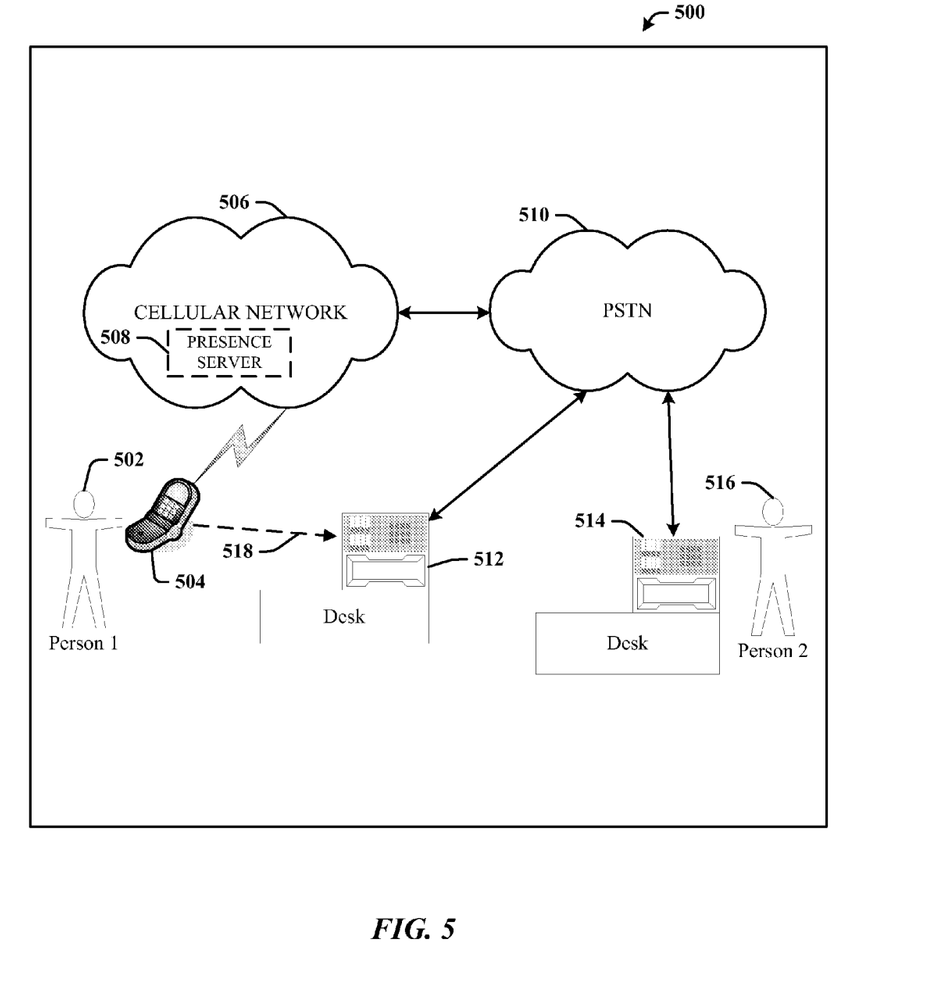
FIG. 5 illustrates a block diagram of operation of the location system.

FIG. 5 illustrates operation of the location system 500. Person 516 wishes to contact user 502 and makes a phone call from person's office telephone 514 to user's office phone at a first location (not shown). However, user 502 is not at the first location and is at user's office at second location 512. The location system 500 detects the physical location of user's mobile device 504 and automatically forwards the call 518 from the first location to the landline at user's second location 512. Thus, the system 500 allows a user 502 to publish his desk phone number at the first location as the only number he could be available at, and the system 500 allows the user 502 to receive calls 518 at the pre-configured numbers depending on the user's physical location.

Specifically, the location component (not shown) publishes presence information of a user's mobile device 504. The presence information is associated with a physical location of the mobile device 504. The presence information is also associated with the location of the mobile device 504 on an IP network. Multiple approaches may be used to detect the mobile device's physical location, such as GPS, LCS, COO, E-OTD, TOA and AOA.

Once the mobile device's physical location is detected, the location component publishes the mobile device's 504 presence information. In one example, a SMS Broadcast is used to allow the cellular network 506 to broadcast the mobile device's 504 location (presence information). Specifically, SIP running on the mobile device 504 publishes a user's rich presence information to the presence server 508, which further forwards the request to the PBX on CSTA (not shown). The PBX includes access to the public switched telephone network (PSTN) 510. This solution can be extended to any other enterprise telephony solution (e.g., soft phone).

Once the mobile device's 504 presence information is published, the routing component (not shown) utilizes the PSTN 510 to automatically route a message to the physical location (second location 512) for communication to a user 502 of the mobile device 504. The message is routed to a pre-configured number 512 associated with the detected physical location of the mobile device 504. A user of the mobile device pre-configures numbers associated with various frequently visited physical locations (e.g., home, club, etc.). As stated supra, the infrastructure allows a user 502 to publish his phone number of the first location as the only number he could be available at, and the infrastructure allows the user to receive calls 518 at the pre-configured numbers depending on the user's physical location.

Figure 6:
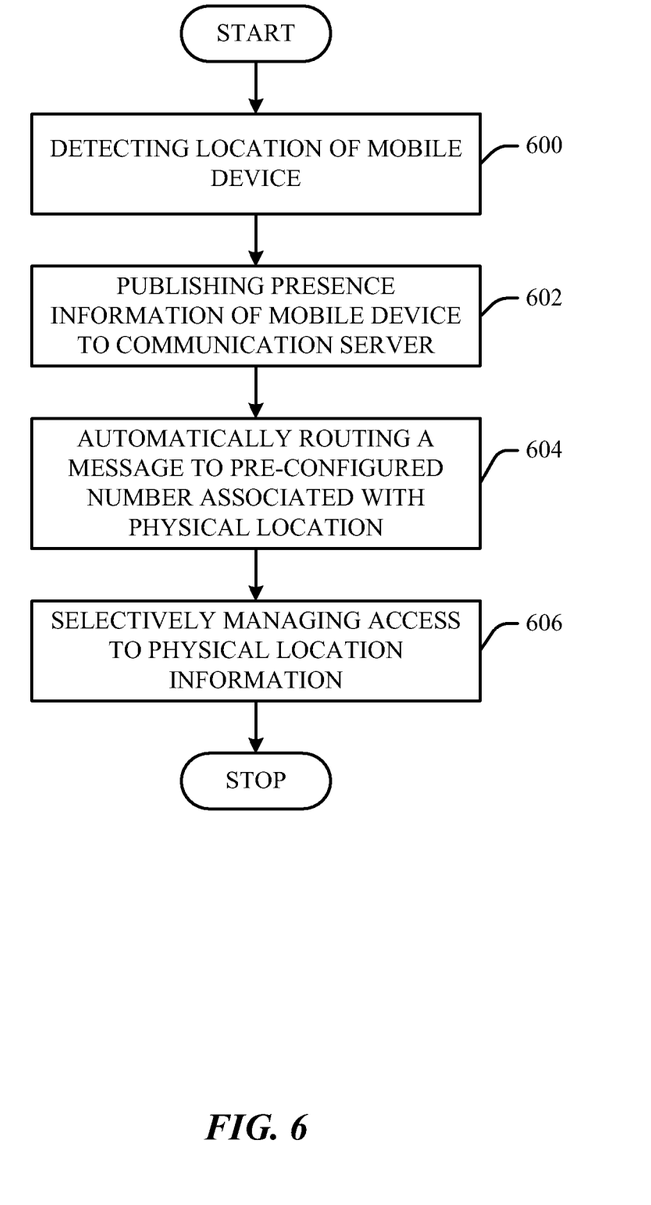
FIG. 6 illustrates a flow chart of a method of detecting location of a user and forwarding messages to a pre-configured number associated with the detected location.
Figure 7:
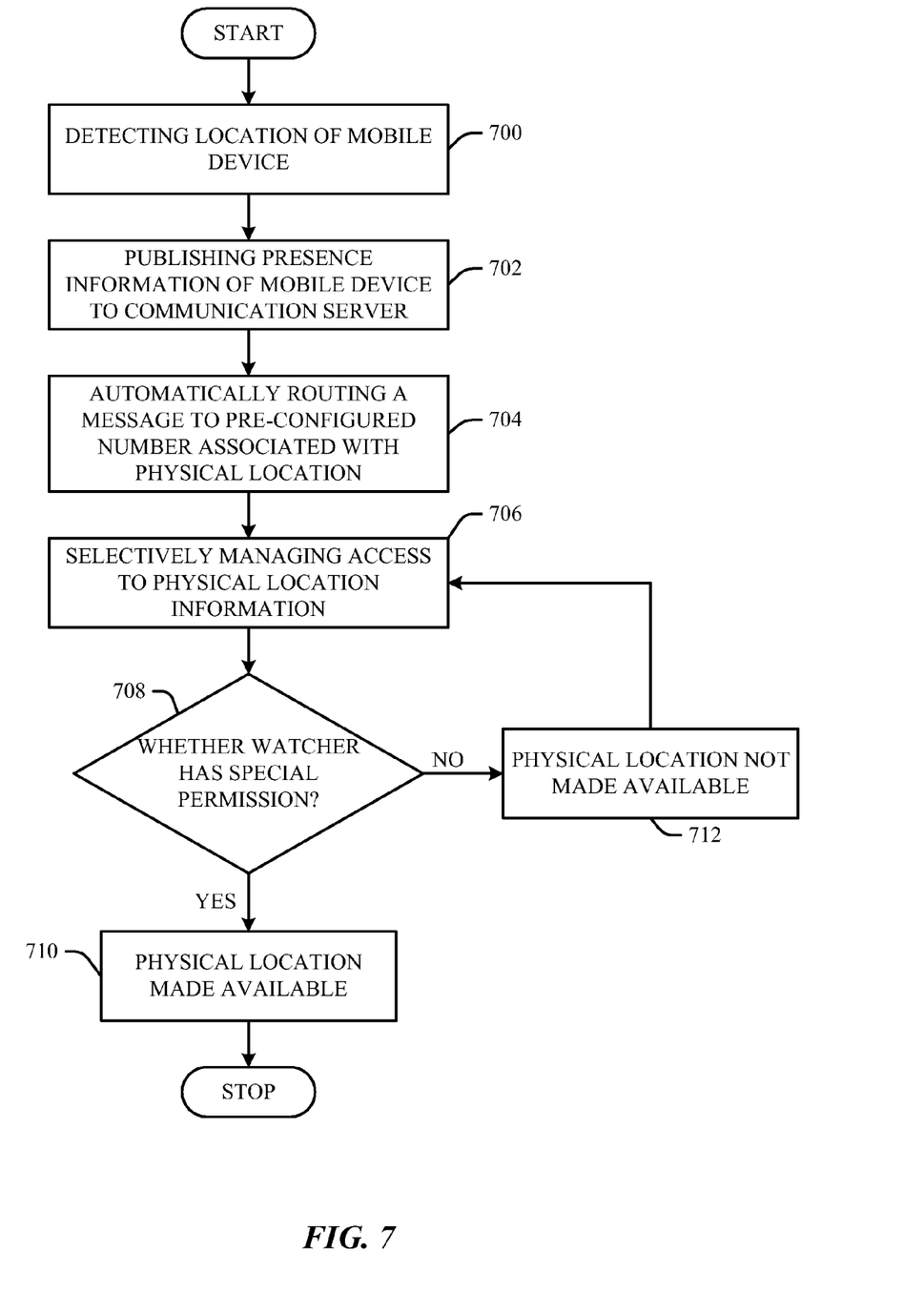
FIG. 7 illustrates a flow chart of a method of selectively managing access to information about the physical location of the mobile device user.
Figure 8:
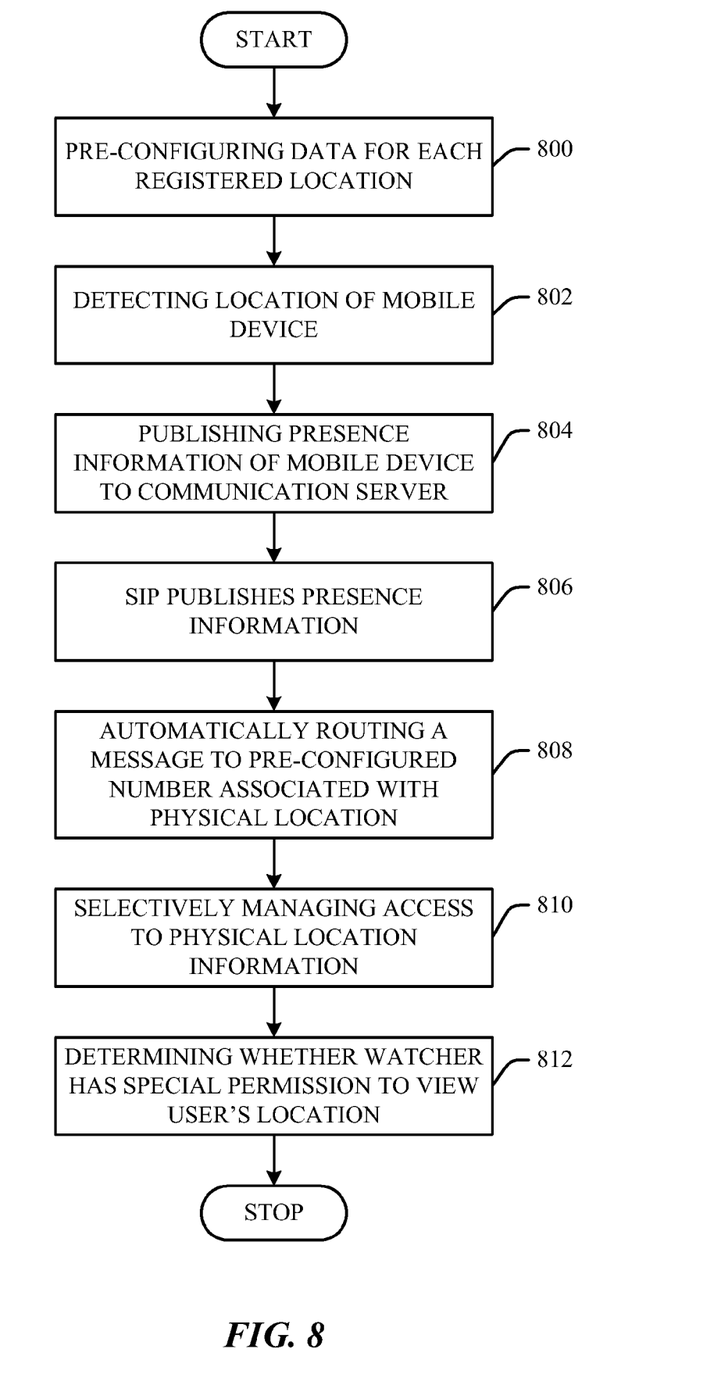
FIG. 8 illustrates a flow chart of a method of automatically routing a message to a pre-configured number associated with a physical location.

FIGS. 6-8 illustrate methodologies of automatically detecting location of a user and forwarding messages to a pre-configured number associated with the detected location, according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring to FIG. 6, a method of automatically detecting location of a user is illustrated. At 600, a physical location of a mobile device is detected. The physical location of the mobile device is determined via GPS, triangulation, location services, or any other similar positioning services. Accordingly, multiple approaches may be used to detect the mobile device's physical location. At 602, presence information of a mobile device is published to a communications server, the presence information is associated with a physical location of the mobile device. The communications server can be a Live Communication Server® which supports an architecture where a user could simultaneous be at multiple devices, such as a Desktop, a Web Client and a Mobile Client. The Mobile Client can represent the physical location where the user is actually present. Further, a Communicator Mobile® running on a user's mobile device can publish the user's physical location. The Communicator Mobile® running at a user's mobile device is able to identify when the user reaches a pre-configured location and sets unconditional forwarding to that specified location.

At 604, once the physical location is determined, messages are automatically routed to a pre-configured number associated with the physical location. The message is a telephone call, email, text mail, etc. The message is routed to a pre-configured number associated with the physical location of the mobile device. A user of the mobile device pre-configures numbers associated with various frequently visited physical locations (e.g., home, club, etc.). The user can enter these numbers directly into the mobile device to be associated with the subscriber information or the numbers can be configured directly to a communications server. Once the numbers are pre-configured for each specific physical location, messages are routed to the pre-determined numbers based on the detected physical location of the mobile device. Thus, the infrastructure allows a user to publish his desk phone number as the only number he could be available at, and the infrastructure allows the user to receive calls at the pre-configured numbers depending on the user's physical location.

And at 606, access to information about the physical location is selectively managed. For privacy reasons, user's location(s) may or may not be made available to the watchers. A watcher is the one who gets presence information from the publisher. For example, when a user is signed into desktop and utilizing an instant messaging (IM) or other messaging service, the messaging service is publishing your presence information to all your buddies or contacts. Your contacts are the watchers of your presence information (i.e., location, availability, activity, notes, calendar, etc.). Thus, for privacy purposes a user's physical location would be kept from the watchers, unless a watcher has been specifically granted permission to view the location(s).

Referring to FIG. 7, a method of selectively managing access to information about the physical location of the mobile device is illustrated. At 700, a physical location of a mobile device is detected. As stated supra, the physical location of the mobile device is determined via GPS, triangulation, location services, or any other similar positioning services. At 702, presence information of a mobile device is published to a communications server, the presence information is associated with a physical location of the mobile device. The communications server can be a Live Communication Server® which supports an architecture where a user could simultaneous be at multiple devices, such as a Desktop, a Web Client and a Mobile Client.

At 704, once the physical location is determined, messages are automatically routed to a pre-configured number associated with the physical location. A user of the mobile device pre-configures numbers associated with various frequently visited physical locations (e.g., home, club, etc.). The user can enter these numbers directly into the mobile device to be associated with the subscriber information or the numbers can be configured directly to a communications server. Once the numbers are pre-configured for each specific physical location, messages are routed to the pre-determined numbers based on the detected physical location of the mobile device.

And at 706, access to information about the physical location is selectively managed. For privacy reasons, user's location(s) may or may not be made available to the watchers. A watcher is the one who gets presence information from the publisher. At 708, it is determined whether the watcher has special permission or not to view the user's physical location(s). At 710, the watcher does have special permission and the user's physical location(s) are made available to the watcher. At 712, the watcher does not have special permission and the user's physical location(s) are not available to the watcher. Thus, for privacy purposes a user's physical location would be kept from the watchers, unless a watcher has been specifically granted permission to view the location(s).

FIG. 8 illustrates a method of automatically routing a message to a pre-configured number associated with a physical location. At 800, a user pre-configures data for each registered physical location. A user of the mobile device pre-configures numbers associated with various frequently visited physical locations (e.g., home, club, etc.). The user can enter these numbers directly into the mobile device to be associated with the subscriber information or the numbers can be configured directly to a communications server. At 802, a physical location of a mobile device is detected. As stated supra, the physical location of the mobile device is determined via GPS, triangulation, location services, or any other similar positioning services. At 804, presence information of a mobile device is published to a communications server, the presence information is associated with a physical location of the mobile device. The communications server can be a Live Communication Server® which supports an architecture where a user could simultaneous be at multiple devices, such as a Desktop, a Web Client and a Mobile Client.

At 806, SIP publishes the presence information. The SIP is a signaling protocol that provides a mechanism for a computing device to locate another computing device on the network that it wants to communicate with and establish a session with the device. Each end-point of the SIP protocol actively contributes to a user's presence by publishing the user and device activity from that end-point. SIP running on the mobile device publishes a user's rich presence information to the Live Communication Server®, which communicates the information further based on the subscription model. In more detail, the mobile device is connected with the Live Communication Server® with data connectivity. The SIP message is sent from the Communicator Mobile® to the server which further forwards the request to the PBX on CSTA. The PBX sets the unconditional forwarding to a user's specified location.

At 808, once the physical location is determined and the presence information is published, messages are automatically routed to a pre-configured number associated with the physical location. Specifically, messages are routed to the pre-determined numbers based on the detected physical location of the mobile device.

And at 810, access to information about the physical location is selectively managed. For privacy reasons, user's location(s) may or may not be made available to the watchers. A watcher is the one who gets presence information from the publisher. At 812, it is determined whether the watcher has special permission or not to view the user's physical location(s). If a watcher has special permission, then the user's physical location(s) are made available to the watcher. If a watcher does not have special permission, then the user's physical location(s) are not available to the watcher. Thus, for privacy purposes a user's physical location would be kept from the watchers, unless a watcher has been specifically granted permission to view the location(s).

Figure 9:
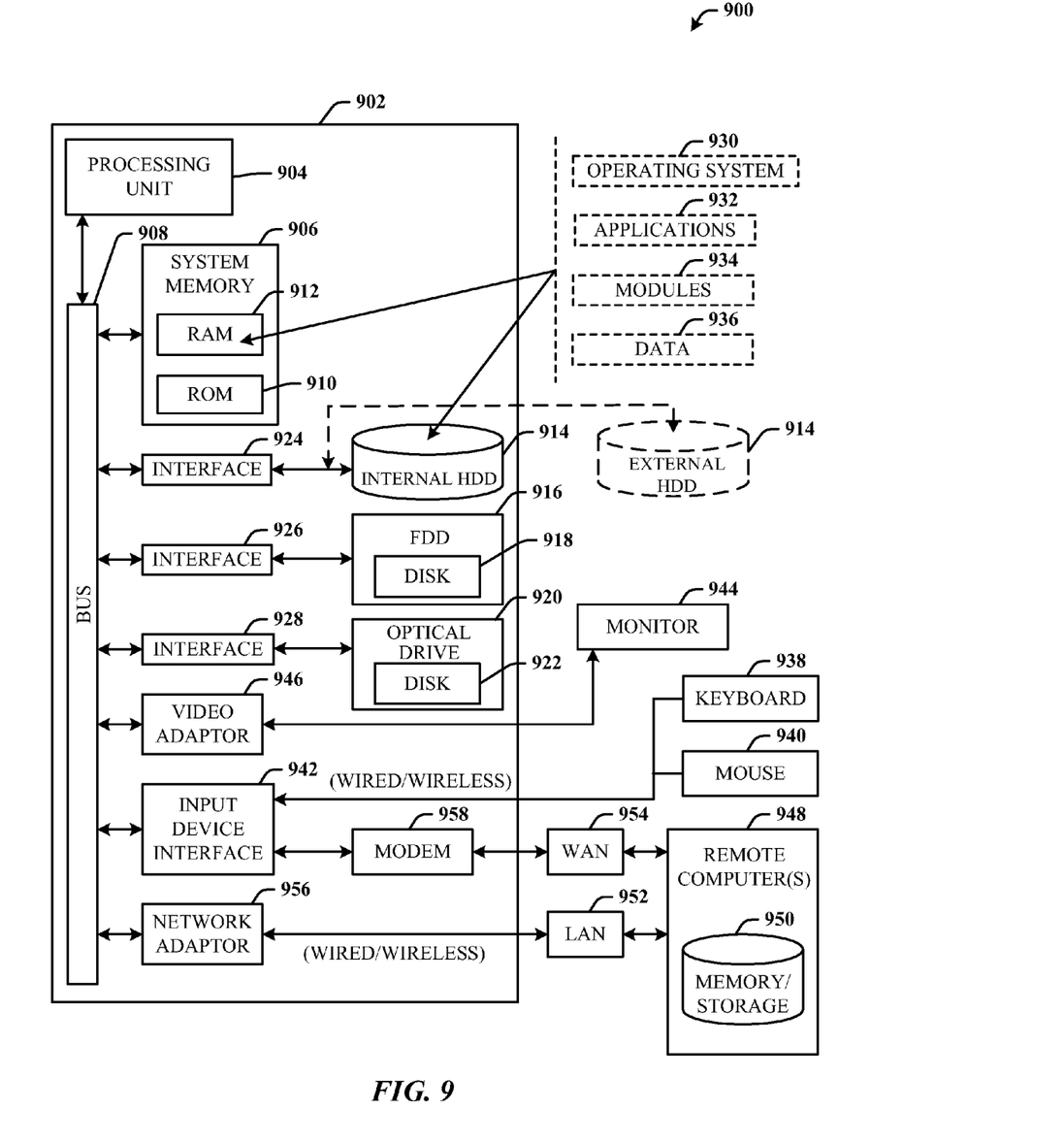
FIG. 9 illustrates a block diagram of a computer operable to execute the disclosed message forwarding architecture.

Referring now to FIG. 9, there is illustrated a block diagram of a computer operable to execute the disclosed message forwarding architecture. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices (e.g., a keyboard 938 and a pointing device, such as a mouse 940). Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks (e.g., a wide area network (WAN) 954). Such LAN and WAN networking environments are commonplace in offices and companies, and facilitate enterprise-wide computer networks, such as intranets, all of which may connect to a global communications network (e.g., the Internet).

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
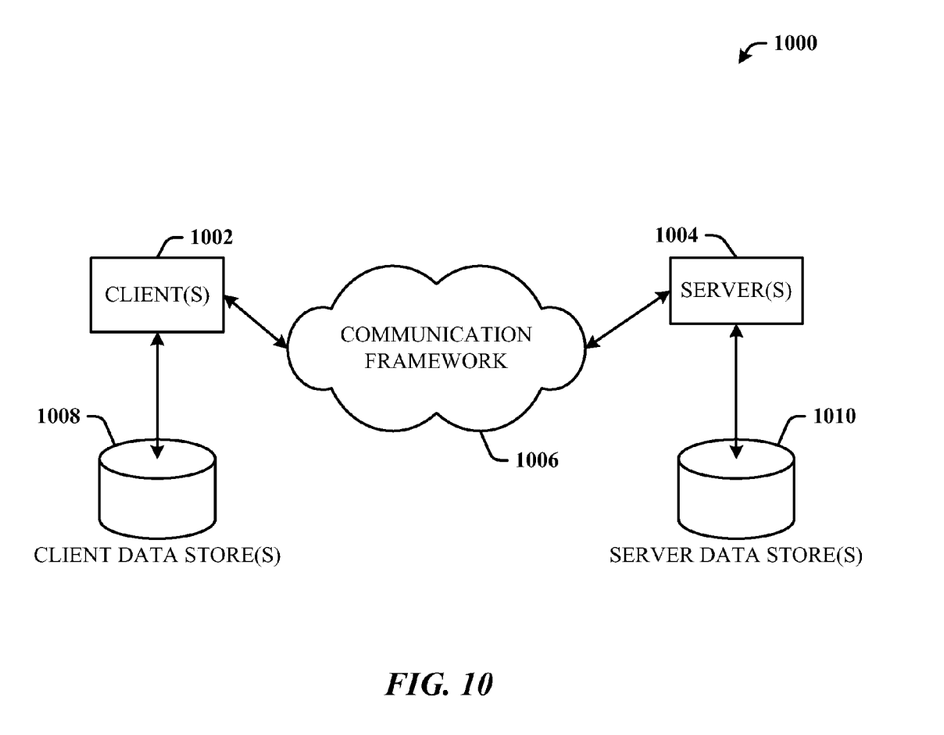
FIG. 10 illustrates a schematic block diagram of an exemplary computing environment for use with the location system.

Referring now to FIG. 10, there is illustrated a schematic block diagram of an exemplary computing environment 1000 in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the subject innovation, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented location system to automatically detect a location of a user and forward messages to a pre-configured number associated with the detected location, comprising:
    a communications server to process presence information to automatically detect a physical location of a mobile device, the presence information is provided by a Session Initiation Protocol (SIP) client running on the mobile device, automatically route a message to a pre-configured number for a second device at the physical location for communication to a user of the mobile device, and selectively manage access by a watcher to information about the physical location of the mobile user, wherein the physical location of the mobile user is made available to the watcher based on specific permissions granted to the watcher.

2. The system of claim 1, wherein the presence information is based on Session Initiation Protocol (SIP) that provides the SIP client running on the mobile device which publishes the presence information to the communications server.

3. The system of claim 1, wherein routing is to a pre-configured number associated with the physical location.

4. The system of claim 3, wherein the routing component automatically forwards the message from a first location to the physical location.

5. The system of claim 1, wherein the presence information is associated with the location of the mobile device on an IP network.

6. The system of claim 1, wherein the message is a telephone call.

7. The system of claim 1, wherein the presence information is published based in part on a short message service (SMS) broadcast.

8. A method of automatically detecting location of a user and forwarding messages to a pre-configured number associated with the detected location, comprising:
    detecting a location of a mobile device;
    publishing presence information of a mobile device to a communications server, the presence information associated with a physical location of the mobile device and based on Session Initiation Protocol (SIP);
    automatically routing a message to the pre-configured number associated with the physical location from a first location to the physical location, wherein the pre-configured number is for a second device; and selectively managing access to information about the physical location of the mobile device, wherein the physical location of the mobile device is published and made available to a watcher based on specific permissions granted to the watcher.

9. The method of claim 8, wherein the location of the mobile device is detected via GPS.

10. The method of claim 8, wherein the location of the mobile device is detected via triangulation.

11. The method of claim 8, wherein the location of the mobile device is detect via location services (LCS).

12. The method of claim 8, wherein a SIP client running on the mobile device publishes the presence information to a communications server.

13. The method of claim 8, wherein the physical location of the mobile device is published and made available to a watcher.

14. The method of claim 8, wherein the physical location of the mobile device is published and not made available to a watcher, unless the watcher has been granted permission to view the location.

15. The method of claim 8, wherein the mobile device comprises one of a multimedia player, a Personal Digital Assistant (PDA), a cellular phone, a smart device, and a hand held computing device.

16. The method of claim 8, wherein the message is a telephone call.

17. A system of automatically detecting location of a user and forwarding messages via SMS to a pre-configured number associated with the detected location, comprising:

means for detecting a location of a mobile device;

means for publishing presence information of a mobile device to a communications server, the presence information associated with a physical location of the mobile device and based on a signaling protocol, wherein a signaling protocol client running on the mobile device publishes the presence information to a communications server;

means for automatically routing a message to the pre-configured number associated with the physical location from a first location to the physical location, wherein the pre-configured number is for a second device; and means for selectively managing access to information about the physical location of the mobile device, wherein the physical location of the mobile device is published and made available to a watcher based on specific permissions granted to the watcher.

* * * * *